United States Patent
Goldberg et al.

(10) Patent No.: US 10,530,770 B2
(45) Date of Patent: Jan. 7, 2020

(54) PRESSURE-BASED AUTHENTICATION

(71) Applicant: International Business Machines Corporation, Armonk, NY (US)

(72) Inventors: Itzhack Goldberg, Hadera (IL); Harry R. McGregor, Tucson, AZ (US); Yossi Mesika, Afula (IL); Christopher B. Moore, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/635,762

(22) Filed: Jun. 28, 2017

(65) Prior Publication Data

US 2019/0007397 A1    Jan. 3, 2019

(51) Int. Cl.
*H04L 29/06* (2006.01)
*G06F 21/62* (2013.01)
(Continued)

(52) U.S. Cl.
CPC ...... *H04L 63/0853* (2013.01); *G06F 3/04883* (2013.01); *G06F 21/31* (2013.01);
(Continued)

(58) Field of Classification Search
CPC .. H04W 12/06; H04W 12/08; H04L 63/0861; H04L 63/107; H04L 63/105;
(Continued)

(56) References Cited

U.S. PATENT DOCUMENTS 5,719,950 A * 2/1998 Osten ............... A61B 5/1171
382/115
6,509,847 B1 * 1/2003 Anderson ............ G06F 1/1616
178/18.01
(Continued)

FOREIGN PATENT DOCUMENTS

CN    101539837 A    9/2009
CN    105516983 A    4/2016
(Continued)

OTHER PUBLICATIONS

Iwasaki, Ken, Takashi Miyaki, and Jun Rekimoto. "Expressive typing: a new way to sense typing pressure and its applications." CHI' 09 Extended Abstracts on Human Factors in Computing Systems. (pp. 4369-4374). ACM, 2009. (Year: 2009).*
(Continued)

*Primary Examiner* — Kari L Schmidt
(74) *Attorney, Agent, or Firm* — Andrew Aubert

(57) ABSTRACT

In an approach to securing data using alternative value identification schemes, one or more computer processors receive user registration data, wherein the user registration data includes one or more authentication parameters, wherein the one or more authentication parameters includes one or more physical pressure-based inputs by a user. The one or more computer processors receive an access request requiring an authentication from the user, wherein the access request includes the one or more physical pressure-based inputs by the user associated with the one or more authentication parameters. The one or more computer processors
(Continued)

determine whether the one or more authentication parameters match the user registration data. Responsive to determining that the authentication data matches the registration data, The one or more computer processors authenticate access for the user.

20 Claims, 6 Drawing Sheets

(51) Int. Cl.
    *G06F 3/0488*     (2013.01)
    *H04W 12/06*     (2009.01)
    *H04L 9/32*     (2006.01)
    *G06F 21/32*     (2013.01)
    *H04W 12/08*     (2009.01)
    *G06F 21/31*     (2013.01)

(52) U.S. Cl.
    CPC .......... *G06F 21/316* (2013.01); *G06F 21/32* (2013.01); *G06F 21/6218* (2013.01); *H04L 9/3231* (2013.01); *H04L 63/083* (2013.01); *H04L 63/0861* (2013.01); *H04L 63/105* (2013.01); *H04W 12/06* (2013.01); *H04W 12/08* (2013.01); *G06F 2221/2117* (2013.01); *H04L 63/107* (2013.01)

(58) Field of Classification Search
    CPC ....... H04L 9/3231; G06F 21/32; G06F 21/31; G06F 21/6218; G06F 2221/2117
    See application file for complete search history.

(56) References Cited

U.S. PATENT DOCUMENTS

| | | | | |
|---|---|---|---|---|
| 6,954,862 | B2* | 10/2005 | Serpa | G06F 21/31 713/183 |
| 8,390,583 | B2* | 3/2013 | Forutanpour | G06F 3/04886 345/168 |
| 8,650,635 | B2* | 2/2014 | Griffin | G06F 21/36 382/173 |
| 9,301,140 | B1* | 3/2016 | Costigan | H04W 12/06 |
| 9,392,460 | B1* | 7/2016 | Blake | H04W 4/029 |
| 2005/0041841 | A1* | 2/2005 | Yoo | G06F 1/1616 382/124 |
| 2006/0093192 | A1* | 5/2006 | Bechtel | G06K 9/00013 382/126 |
| 2007/0223685 | A1* | 9/2007 | Boubion | G06F 21/31 380/2 |
| 2010/0180324 | A1* | 7/2010 | Karur | G06F 21/31 726/6 |
| 2011/0252464 | A1* | 10/2011 | Sanjeev | H04L 63/107 726/7 |
| 2011/0267445 | A1* | 11/2011 | Oguchi | A61B 5/1172 348/77 |
| 2011/0299740 | A1* | 12/2011 | Mori | A61B 5/0059 382/115 |
| 2012/0126941 | A1* | 5/2012 | Coggill | G06F 21/36 340/5.54 |
| 2012/0194447 | A1* | 8/2012 | Lin | G06F 3/04883 345/173 |
| 2012/0306766 | A1* | 12/2012 | Moore | G06F 3/04883 345/173 |
| 2012/0326839 | A1* | 12/2012 | Du | G06F 21/31 340/5.54 |
| 2013/0004032 | A1* | 1/2013 | Abiko | G06K 9/00087 382/124 |
| 2013/0160141 | A1* | 6/2013 | Tseng | G06F 21/6245 726/28 |
| 2013/0214801 | A1* | 8/2013 | Hsiao | G06K 9/0002 324/692 |
| 2013/0214905 | A1* | 8/2013 | Ota | G06F 21/316 340/5.81 |
| 2013/0347101 | A1* | 12/2013 | Wu | G06F 3/04883 726/19 |
| 2014/0028601 | A1* | 1/2014 | Moore | G06F 3/04883 345/173 |
| 2014/0035849 | A1* | 2/2014 | Jung | G06F 3/041 345/173 |
| 2014/0176332 | A1* | 6/2014 | Alameh | G06F 21/32 340/665 |
| 2014/0189808 | A1* | 7/2014 | Mahaffey | H04L 63/083 726/4 |
| 2014/0242949 | A1* | 8/2014 | Burch | H04W 12/06 455/411 |
| 2015/0213244 | A1* | 7/2015 | Lymberopoulos | G06F 21/32 726/18 |
| 2015/0242601 | A1* | 8/2015 | Griffiths | G06F 21/305 726/5 |
| 2015/0268785 | A1* | 9/2015 | Lynn | G06F 3/041 345/177 |
| 2015/0278492 | A1* | 10/2015 | Tungare | G06F 21/31 726/19 |
| 2015/0293622 | A1* | 10/2015 | Han | H04W 12/06 345/174 |
| 2015/0363632 | A1* | 12/2015 | Ahn | G06F 3/0412 382/124 |
| 2016/0140379 | A1* | 5/2016 | Pedersen | G06K 9/00919 726/19 |
| 2016/0188181 | A1* | 6/2016 | Smith | G06F 3/048 715/765 |
| 2016/0232341 | A1* | 8/2016 | Alameh | G06F 21/35 |
| 2016/0253568 | A1 | 9/2016 | Idzik et al. | |
| 2016/0320914 | A1* | 11/2016 | Tachikawa | G01L 1/205 |
| 2016/0321445 | A1 | 11/2016 | Turgeman et al. | |
| 2016/0321492 | A1* | 11/2016 | Mankowski | G06F 21/32 |
| 2016/0335530 | A1* | 11/2016 | Davis | G06K 19/0727 |
| 2017/0063851 | A1* | 3/2017 | Kim | H04L 63/0861 |
| 2017/0068367 | A1* | 3/2017 | Francis | G06F 16/243 |
| 2017/0140174 | A1* | 5/2017 | Lacey | G06F 21/6245 |
| 2017/0180988 | A1 | 6/2017 | Kim et al. | |
| 2018/0224989 | A1* | 8/2018 | Deasy | G06F 3/016 |
| 2018/0260108 | A1* | 9/2018 | Hajimusa | G06F 3/04842 |
| 2018/0307821 | A1* | 10/2018 | Le Bail | G06F 21/35 |
| 2018/0349592 | A1* | 12/2018 | Tao | G06F 21/36 |
| 2019/0147153 | A1* | 5/2019 | Bai | G06F 21/32 726/19 |

FOREIGN PATENT DOCUMENTS

| | | |
|---|---|---|
| KR | 1020120130971 A | 12/2012 |
| WO | 2017119785 A1 | 7/2017 |

OTHER PUBLICATIONS

K. Krombholz, T. Hupperich and T. Holz, "May the Force Be with You: The Future of Force-Sensitive Authentication," in IEEE Internet Computing, vol. 21, No. 3, pp. 64-69, May-Jun. 2017. (Year: 2017).*

Stewart, Craig, et al. "Characteristics of pressure-based input for mobile devices." Proceedings of the SIGCHI Conference on Human Factors in Computing Systems. (pp. 801-810). ACM, 2010. (Year: 2010).*

Appendix P, List of IBM Patents or Patent Applications Treated as Related, 2 pages, dated Jan. 17, 2018.

Goldberg et al., "Pressure-Based Authentication", U.S. Appl. No. 15/849,936, filed Dec. 21, 2017, 42 pages.

Dempsey et al., "Tactile sensing in human-computer interfaces: The inclusion of pressure sensitivity as a third dimension of user input", Elsevier, Department of Physics, Durham University, South Road, Durham DH1 3LE, UK, Available online Jun. 3, 2015, © 2015 Elsevier B.V., 22 pages.

Mell et al., "The NIST Definition of Cloud Computing", Recommendations of the National Institute of Standards and Technology, NIST Special Publication 800-145, Computer Security Division

(56) References Cited

OTHER PUBLICATIONS

Information Technology Laboratory, National Institute of Standards and Technology, Gaithersburg, MD 20899-8930, Sep. 2011, 7 pages.
"Method and System for Enhancing Keystroke Based Authentication", An IP.com Prior Art Database Technical Disclosure, Authors et. al.: Disclosed Anonymously, IP.com Number: IPCOM000210023D, IP.com Electronic Publication Date: Aug. 22, 2011, 4 pages.
Kolly et al., "A personal touch: Recognizing users based on touch screen behavior." Proceedings of the Third International Workshop on Sensing Applications on Mobile Phones. ACM, 2012, 5 pages.
Sen et al., "Putting 'pressure' on mobile authentication." Mobile Computing and Ubiquitous Networking (ICMU), 2014 Seventh International Conference on. (pp. 56-61). IEEE, 2014, 6 pages.
Goldberg et al., "Pressure-Based Authentication", U.S. Appl. No. 16/392,683, filed Apr. 24, 2019, 44 pages.
IBM Appendix P, list of patents and patent applications treated as related, Filed Herewith, 2 pages.

\* cited by examiner

PRESSURE-BASED AUTHENTICATION

BACKGROUND OF THE INVENTION

The present invention relates generally to the field of data security, and more particularly to the field of pressure-based authentication as a data security measure.

Authentication is the act of confirming the truth of an attribute of data claimed true by an entity. In contrast with identification, which refers to the act of stating or otherwise indicating a claim purportedly attesting to the identity of a person, authentication is the process of actually confirming the identity of a person. For example, authentication may involve confirming the identity of a person by validating identity documents, verifying the authenticity of a website with a digital certificate, determining the age of an artifact by carbon dating, and/or ensuring that a product is what its packaging and labeling claim to be. In other words, authentication often involves verifying the validity of at least one form of identification.

SUMMARY

Embodiments of the present invention disclose an apparatus, a method, and a computer program product for securing data using alternative value identification schemes. One or more computer processors receive user registration data, wherein the user registration data includes one or more authentication parameters, wherein the one or more authentication parameters includes one or more physical pressure-based inputs by a user. The one or more computer processors receive an access request requiring an authentication from the user, wherein the access request includes the one or more physical pressure-based inputs by the user associated with the one or more authentication parameters. The one or more computer processors determine whether the one or more authentication parameters match the user registration data. Responsive to determining that the authentication data matches the registration data, The one or more computer processors authenticate access for the user.

DETAILED DESCRIPTION

Present day authentication methods require simple alphanumeric and symbolic strings of characters to authenticate a user. Though these methods may be effective in theory, the application of passwords in present day applications opens individuals up to vulnerability because the passwords are usually simple and repeated in various applications with little to no variation. For example, a user may have the same or similar password for multiple accounts, such as e-commerce accounts, email accounts, and mobile banking accounts. Further, the current systems of authentication encourage users to do the bare minimum to meet password requirements, such as the inclusion of a special character. As such, third parties attempting to access protected data can compromise the security of protected data from multiple sources with a singular breach in data security.

Additionally, the alphanumeric and symbolic basis of present-day passwords is tied to the actual characters entered into a system for authentication. As such, a third party attempting to compromise a security measure has many tools available at their disposal, such as key loggers, remote administration tools, and trojan horse viruses. By tying authentication measures to novel hardware, such as pressure sensitive screens and touch pads, an additional layer of variability may be introduced into the system to significantly multiply the complexity of an authentication measure associated with a user. For example, the introduction of a pressure sensitive code to accessing a mobile banking application may inhibit a hacker from accessing protected data by merely inputting an alphanumeric and symbolic password into the mobile banking application.

As the prevalence of hacking grows, technology made to increase the complexity of authentication measures using novel methods becomes increasingly important. Robust authentication systems employing a variety of conventional and non-conventional inputs may provide better security in present-day software. Implementation of embodiments of the invention may take a variety of forms, and exemplary implementation details are discussed subsequently with reference to the Figures.

Figure 1:
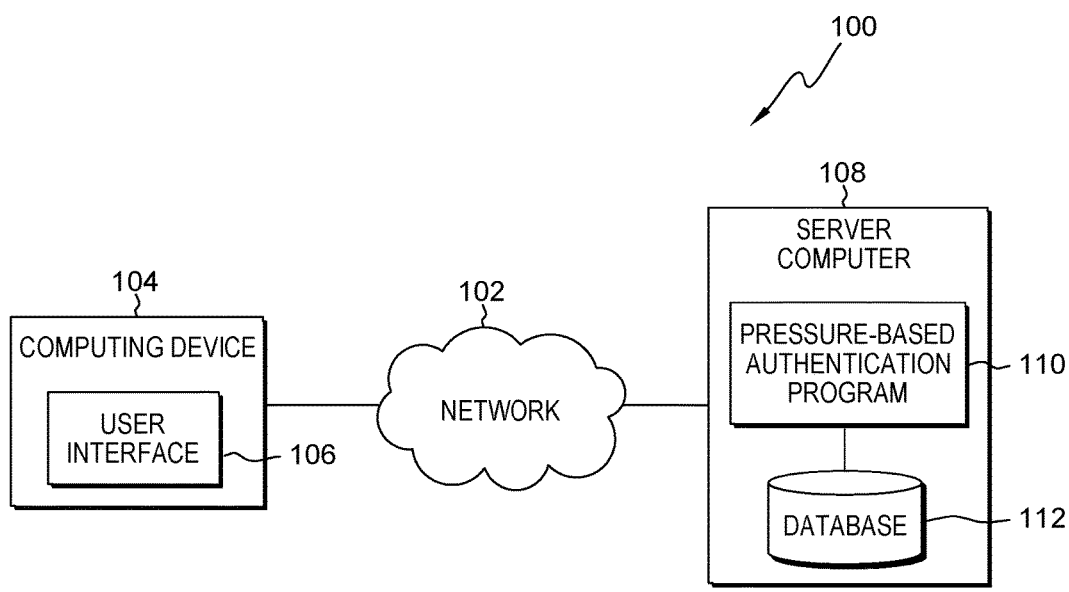
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104 and server computer 108, and other computing devices (not shown) within distributed data processing environment 100.

Computing device 104 can be a laptop computer, a tablet computer, a smart phone, or any programmable electronic computing device capable of communicating with various components and devices within distributed data processing environment 100, via network 102. In general, computing device 104 represents any programmable electronic computing device or combination of programmable electronic computing devices capable of executing machine readable program instructions, manipulating executable machine readable instructions, and communicating with server computer 108 and other computing devices (not shown) within distributed data processing environment 100 via a network, such as network 102. Computing device 104 includes an instance of user interface 106. Computing device 104 and user interface 106 allow a programmer to input pressure-based authentication to pressure-based authentication program 110.

User interface 106 provides an interface to pressure-based authentication program 110 on server computer 108 for a user of computing device 104. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of computing device 104 and server computer 108. Mobile application software, or an "app," is a computer program designed to run on smart phones, tablet computers and other mobile devices. In an embodiment, user interface 106 enables the user of computing device 104 to register with and input pressure-based authentication to pressure-based authentication program 110 to access secured data on computing device 104.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any other programmable electronic device capable of communicating with computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes pressure-based authentication program 110 and database 112. Server computer 108 may include internal and external hardware components, as depicted and described in further detail with respect to FIG. 4. In other embodiments, server computer 108 and computing device may be implemented in a cloud-based environment, as depicted and described in further details with respects to FIG. 5 and FIG. 6.

Pressure-based authentication program 110 resides on server computer 108 and initiates when pressure-based authentication program 110 receives a user registration request from a user. In another embodiment, pressure-based authentication program 110 may be a local program on computing device 104 and may reside on computing device 104. In yet another embodiment, pressure-based authentication program 110 may be a program executed from cloud computing environment and may be executed on computing device 104. In response, pressure-based authentication program 110 requests user registration data. For example, pressure-based authentication program 110 may request the identity, such as a name and date of birth, a geolocation, and any other identifying characteristics of a user that may be associated with valid authentication. Pressure-based authentication program 110 receives the user registration data. Following the receipt of user registration data, pressure-based authentication program 110 requests one or more authorization parameters associated with the user and associated user registration data. For example, pressure-based authentication program 110 may request the security clearances of a user for protected data, the times and locations where a user may access the protected data, and the permissions of a user associated with modification of protected data after access. Pressure-based authentication program 110 receives the one or more authorization parameters associated with the user and associated user registration data.

Pressure-based authentication program 110 requests one or more authentication parameters. For example, pressure-based authentication program 110 may request a pressure-based authentication associated with valid authentication for a user. A pressure-based authentication may be any user authentication input with an additional element of pressure-based identification. For example, a pressure-based authentication may include an alphanumeric password with a required input pressure specific to each character. In another example, a pressure-based authentication may include a set of colors in a particular order with each color associated with a particular pressure value. Pressure-based authentication program 110 receives the one or more authentication parameters. Finally, pressure-based authentication program 110 stores the user registration data, the authorization parameters, and the authentication parameters associated with the user. The user registration data, the authorization parameters, and the authentication parameters associated with the user may be stored in a database, such as database 112. The user registration data, the authorization parameters, and the authentication parameters associated with the user may be stored in a cloud-based environment in other embodiments.

Following the storage of the user registration data and authorization parameters associated with the user, pressure-based authentication program 110 initiates a second function when pressure-based authentication program 110 receives one or more authentication requests from one or more users. For example, an authentication request may be a user accessing a mobile banking application and selecting the password input box which is sent as an authentication request to pressure-based authentication program 110. Pressure-based authentication program 110 identifies one or more users associated with the one or more authentication requests. For example, pressure-based authentication program 110 may identify a user associated with an authentication request to access a mobile banking application by identifying the internet protocol (IP) address and geolocation associated with the authentication request.

Pressure-based authentication program 110 determines whether the one or more users meet the one or more authorization parameters. In one embodiment, pressure-based authentication program 110 determines whether a user falls within a required period of time in the day and a required geolocation to access secured data. Responsive to determining that the one or more users do not meet the one or more authorization parameters, pressure-based authentication program 110 returns to the initial step of the second function of pressure-based authentication program 110 to receive one or more authentication request from one or more users. Responsive to determining that the one or more users meet the one or more authorization parameters, pressure-based authentication program 110 requests one or more pressure-based authentications. Pressure-based authentication program 110 receives one or more pressure-based authentications.

Pressure-based authentication program 110 determines whether the one or more pressure-based authentications match the stored authentication data. In one embodiment, pressure-based authentication program 110 determines whether the pressure-based authentication matches authentication data stored in a physical database, such as database 112, over network 102. In another embodiment, pressure-based authentication program 110 determines whether the pressure-based authentication matches authentication data stored in a cloud environment over network 102. Responsive to determining that the one or more pressure-based authentications do not match the stored authentication data, pressure-based authentication program 110 returns to the initial step of the second function of pressure-based authentication program 110 to receive one or more authentication request from one or more users. Responsive to determining that the one or more pressure-based authentications match the stored authentication data, pressure-based authentication program 110 authenticates the one or more users. Pressure-based authentication program 110 is depicted and described in further detail with respect to FIG. 2 and FIG. 3.

Database 112 is a repository for data used and stored by pressure-based authentication program 110. In the depicted embodiment, database 112 resides on server computer 108. In another embodiment, database 112 may reside elsewhere within distributed data processing environment 100 provided pressure-based authentication program 110 has access to database 112. A database is an organized collection of data. Database 112 can be implemented with any type of storage device capable of storing data and configuration files that can be accessed and utilized by server computer 108, such as a database server, a hard disk drive, or a flash memory. Database 112 stores required access request parameters, user access permissions, and data corresponding to user access permissions of a computing device, such as computing device 104. Database 112 also stores user registration data, authorization parameters, and authentication data inputted by a user of computing device 104 via user interface 106 for the purpose of providing pressure-based authentication program 110 the means to identify a user and the associated user access permissions. In some embodiments, database 112 may also store data as one of multiple databases in a cloud-based environment.

Figure 2:
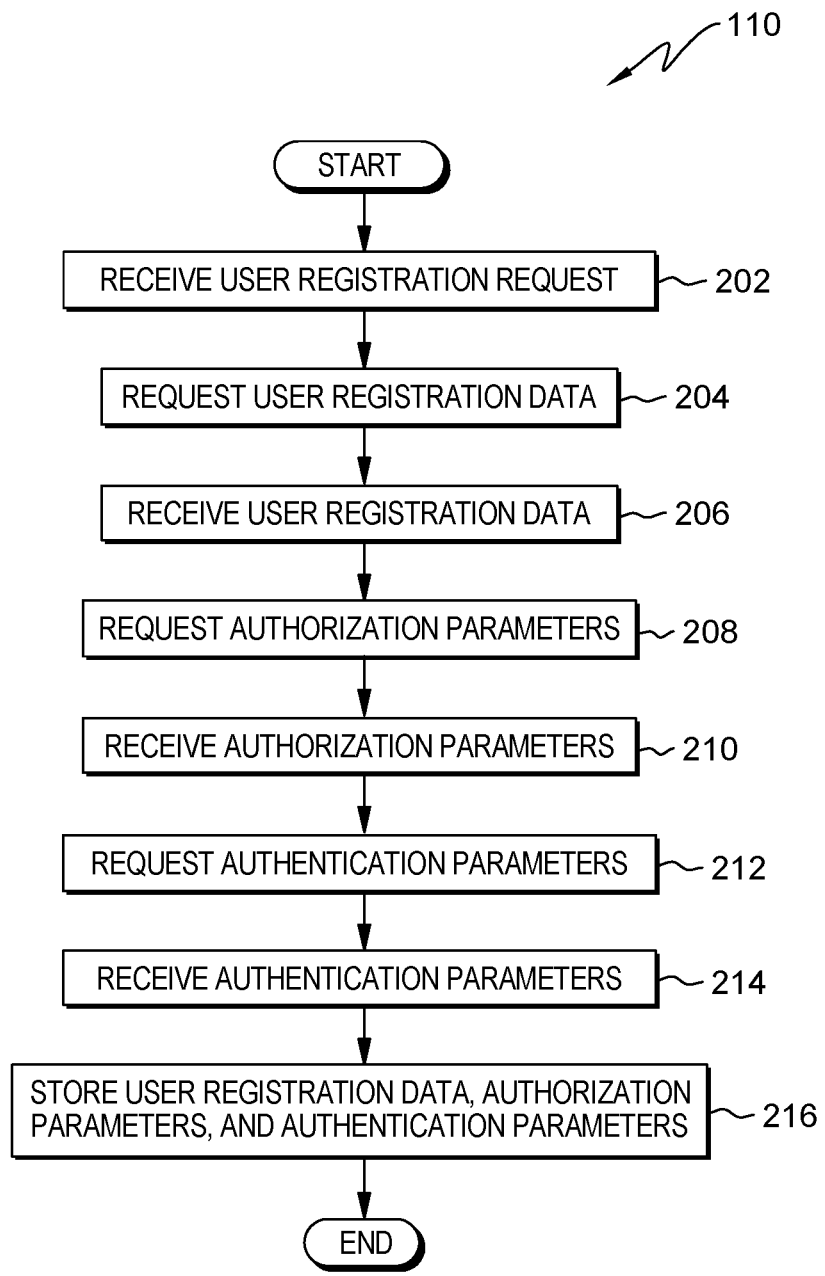
FIG. 2 is a flowchart depicting the operational steps of a first function of a pressure-based authentication program, on a server computer within the distributed data processing environment of FIG. 1, for receiving user registration data and authorization parameters, in accordance with an embodiment of the present invention.

FIG. 2 is a flowchart depicting operational steps of a first function of pressure-based authentication program 110, on server computer 108 within distributed data processing environment 100 of FIG. 1, a program for receiving user registration data and authorization parameters, in accordance with an embodiment of the present invention. The first function of pressure-based authentication program 110 starts when pressure-based authentication program 110 receives a user registration request.

Pressure-based authentication program 110 resides on server computer 108 and initiates when pressure-based authentication program 110 receives a user registration request from a user (step 202). A user registration request may be any request for an initial or a subsequent input of one or more identities of a user and any associated information. For example, a user of computing device 104, such as a smartphone, may request an initial registration to a computer program using user interface 106 on the smartphone. In another example, a user of computing device 104, such as a desktop computer, may request an initial registration to a web service using user interface 106 on a desktop computer through a web-user interface. In yet another example, a user of computing device 104, such as a desktop computer, may request an initial registration to a native computer program using user interface 106 on a desktop computer through a graphic-user interface. In yet another example, a user of computing device 104, such as a smartphone, may request to update the registration data of the user for a web service using user interface 106 through a web-user interface.

Responsive to receiving a user registration request, pressure-based authentication program 110 requests user registration data (step 204). For example, pressure-based authentication program 110 may request the identity, such as a name and date of birth, a geolocation, and any other identifying characteristics or credentials of a user that may be associated with valid authentication. Credentials may be identifying numbers, job titles, or any other assigned identification factors associated with authorization parameters specific to a user. In one embodiment, pressure-based authentication program 110 may request a name, a date of birth, and an address of residence of a user to store in a database, such as database 112. In another embodiment, pressure-based authentication program 110 may request a job title, a company, and an address associated with a place of employment from a user to store in a database, such as database 112 or a cloud-based environment.

Pressure-based authentication program 110 receives the user registration data (step 206). In one embodiment, pressure-based authentication program 110 may receive the user registration data directly from a user through user interface 106. For example, a user may input user registration data to pressure-based authentication program 110 stored locally on a hard drive in server computer 108. In another embodiment, pressure-based authentication program 110 may receive the user registration data through network 102 to be stored in database 112. For example, a user may input registration data to pressure-based authentication program 110 through a web-user interface to be stored remotely in a hard drive in server computer 108. In yet another embodiment, pressure-based authentication program 110 may receive user registration data from a user through network 102 to be stored in a cloud-based environment. For example, a user may input user registration data to pressure-based authentication program 110 to be stored in a network of databases connected over network 102 in a cloud-based environment.

Following the receipt of user registration data, pressure-based authentication program 110 requests one or more authorization parameters associated with the user and associated user registration data (step 208). For example, pressure-based authentication program 110 may request the security clearances of a user for protected data, the times and locations where a user may access the protected data, and the permissions of a user associated with modification of protected data after access. In one embodiment, pressure-based authentication program 110 may request one or more authorization parameters directly from a user. For example, pressure-based authentication program 110 may send a request to an administrator to input the security clearances of one or more users regarding the access of protected data through user interface 106, such as a graphical-user interface. In another example, pressure-based authentication program 110 may request one or more authorization parameters from a user of computing device 104 through user interface 106 for one or more authorization parameters. In yet another example, pressure-based authentication program 110 may request one or more authorization parameters for a user regarding the allowable geolocations for access to protected data, such as allowable locations where the user may access confidential company files.

In an alternative embodiment, pressure-based authentication program 110 may not request one or more authorization parameters and automatically retrieve one or more authorization parameters associated with the user and associated user registration data. For example, pressure-based authentication program 110 may limit a user to only accessing a particular type of protected data, such as financial data, in a particular set of locations, such as the campus of a company and satellite offices, based on the job title and security clearance of a user. In another example, pressure-based authentication program 110 may limit a user, such as a minor, to only accessing particular websites for less than three hours per day based on the age of the user. However, pressure-based authentication program 110 is not limited to the embodiments herein and may receive the one or more authorization parameters through any method available in the art.

Pressure-based authentication program 110 receives the one or more authorization parameters associated with the user and associated user registration data (step 210). In one embodiment, pressure-based authentication program 110 may receive one or more authorization parameters directly from a user. For example, an administrator of pressure-based authentication program 110 may input the security clearances of one or more user regarding the access of protected data. In another example, pressure-based authentication program 110 may receive one or more authorization parameters from a user of computing device 104 through user interface 106 for one or more authorization parameters, such as limitations on access to particular websites and limitations on the amount of time a user may access particular content for a web-browser. In yet another example, pressure-based authentication program 110 may receive one or more authorization parameters for a user regarding the allowable geolocations for access to protected data, such as allowable locations where the user may access confidential company files.

In another embodiment, pressure-based authentication program 110 may automatically retrieve one or more authorization parameters associated with the user and associated user registration data. For example, pressure-based authentication program 110 may limit a user to only accessing a particular type of protected data, such as financial data, in a particular set of locations, such as the campus of a company and satellite offices, based on the job title and security clearance of a user. In another example, pressure-based authentication program 110 may limit a user, such as a minor, to only accessing particular websites for less than three hours per day based on the age of the user. However, pressure-based authentication program 110 is not limited to the embodiments herein and may receive the one or more authorization parameters through any method available in the art.

Pressure-based authentication program 110 requests one or more authentication parameters (step 212). For example, pressure-based authentication program 110 may request a pressure-based authentication to be associated with valid authentication for a user. A pressure-based authentication may be any authentication input with an additional element of pressure-based identification. For example, a pressure-based authentication may be associated with a pressure value. A pressure value may be represented by one or more alphanumeric character, visual feedback, one or more sound-based feedback, one or more mechanical feedback, one or more colors, or any combination thereof. Mechanical feedback may include any touch sensitive feedback, such as vibration, haptic feedback, and temperature-based feedback. A pressure value may also be specific to particular devices and based on a determined pressure sensitivity scale using a ratio to match the pressure sensitivity of an input medium to a standardized pressure sensitivity scale. For example, 1:2 ratio between the standardized pressure sensitivity scale and a particular device can be normalized to a 1:1 ratio by adjusting how pressure-based authentication program registers the pressure sensitivity of the particular device.

In an alternative embodiment, pressure sensitivity scales may be tied to device-specific keys. For example, if a first smartphone model registers a pressure sensitivity of three out of ten on the pressure sensor of the first smartphone model and sends an annotation of "+", then pressure-based authentication program 110 may refer to a first smartphone model-specific key that equates the annotation of "+" to a pressure value of three. In a related example, if a second smartphone model registers a pressure sensitivity of three out of ten on the pressure sensor of the second smartphone model and sends an annotation of "&", then pressure-based authentication program 110 may refer to a second smartphone model-specific key that equates the annotation of "&" for the second smartphone model as a pressure value of three. Pressure values are not limited to the embodiments and exampled discussed herein and may be any representation of input pressure known in the art.

As pressure sensitivity may vary among different devices, pressure values associated with the amount of pressure a user exerts on an input interface may be adapted using an algorithm, such as a ratio, in the form of pressure sensitivity data. Pressure sensitivity data normalizes pressure values across multiple types of devices with varying pressure sensitivities associated with the different input mediums of the multiple types devices. Pressure sensitivity data may be sent from computing device 104, sent to computing device 104, or anything combination thereof. For example, if the pressure sensor associated with an input medium of computing device 104, such as the pressure sensor coupled with a tablet screen, is half as sensitive to pressure as the pressure sensor of a smartphone screen, then pressure-based authentication program 110 may send pressure sensitivity data, such as a pressure sensitivity ratio between two devices, particular to the tablet that requires double the amount of pressure on the tablet screen to register as a pressure value of "5" compared to registering a pressure value of "5" on the smartphone screen. In another example, computing device 104 may contain pressure sensitivity data natively and may send the pressure sensitivity data to pressure-based authentication program 110.

In one embodiment, a pressure-based authentication may include an alphanumeric password with a required input pressure specific to each character. For example, a pressure-based authentication may associate an additional value with each alphanumeric character based on the amount of pressure a user exerts on the input medium. Illustrating the aforementioned example, pressure-based authentication program 110 may request a pressure-based authentication that is at least five characters long. For each of the characters, pressure-based authentication program 110 may request the user to input a pressure associated with a minimum pressure value of "0" and a maximum pressure value of "10" for each character in the pressure-based authentication. As such, each character of the pressure-based authentication "abcde" may have a pressure value of "35424" associated with each character, respectively. On user interface 106, such as a smartphone screen with one or more pressure sensors, the characters may have a variable pressure value displayed next to a selected character with the pressure value adapting to the pressure exerted on the smartphone screen by the user. If a user selects the character "a" on the virtual keyboard, then a pressure value of "2" may appear next to the character. To properly input the first character of the pressure-based authentication, the user may exert enough pressure to bring the displayed value next to the character "a" to "3" which, upon holding at a pressure value of "3" for a particular amount of time, such as at least one second, pressure-based authentication program 110 may accept the character and associated pressure-value input.

In another embodiment, a pressure-based authentication may include a set of colors in a particular order with each color associated with a particular pressure value. For example, a pressure-based authentication may associate an additional color with each alphanumeric character based on the amount of pressure a user exerts on the input medium. Illustrating the aforementioned example, pressure-based authentication program 110 may request a pressure-based authentication that is at least five characters long. For each of the characters, pressure-based authentication program 110 may request the user to input a pressure associated with a minimum pressure value of "0" and a maximum pressure value of "5" for each character in the pressure-based authentication. Each pressure value may be associated with a color, such as white for "0", blue for "1", red for "2", green for "3", yellow for "4", and pink for "5". As such, each character of the pressure-based authentication "abcde" may have colors "green-pink-yellow-red-yellow" associated with the pressure values of "35424" which are associated with each character, respectively. On user interface 106, such as a smartphone screen with one or more pressure sensors, the characters may have a color displayed next to a selected character associated with the pressure value adapting to the pressure exerted on the smartphone screen by the user. If a user selects the character "a" on the virtual keyboard, then the character may be highlighted as red associated with the pressure value of "2". To properly input the first character of the pressure-based authentication, the user may exert enough pressure to bring the color associated with the character "a" to "green" which, upon holding at a pressure value of "3" for a particular amount of time, such as at least one second, pressure-based authentication program 110 may accept the character and associated pressure-value input.

In yet another embodiment, pressure-based authentication program 110 may modify an existing password to represent the same values using a separate value identification scheme. By modifying existing passwords to accommodate multiple value identification schemes, pressure-based authentication program 110 can assist a user in more easily remember complex passwords and allow for backwards compatibility with existing passwords. For example, pressure-based authentication program 110 may apply two separate value identification schemes for a password of "abcde" by associating pressure-based inputs and non-pressure-based inputs with the existing alphanumeric scheme as well as applying different colors for each alphanumeric character. Non-pressure-based inputs may include alternatives to pressure values, such as colors, symbols, alphanumerical values, and any other identifying characteristics associated with one or more passwords. As such, different pressure levels exerted by a user on a screen may display as a change of color so that a user only need remember that "a" is represented by the color blue, "b" is represented by the color yellow, "c" is represented by the color green, "d" is represented by the color brown, and "e" is represented by the color red. Therefore, a user input of the colors of "blue-yellow-green-brown-red" translates to the password "abcde" without having to display the alphanumerical values to the user. In a related embodiment, the user can use a color legend to determine the correct numerical value and use that password in legacy systems directly which do not have the ability to use pressure sensitive input devices which allows for backwards compatibility for the user without adding large amounts of complexity.

Pressure-based authentication program 110 receives the one or more authentication parameters (step 214). In one embodiment, pressure-based authentication program 110 may receive the one or more authentication parameters directly from a user through user interface 106, such as a graphical-user interface or a web-user interface. In another embodiment, pressure-based authentication program 110 may receive the one or more authentication parameters through network 102. In yet another embodiment, pressure-based authentication program 110 may receive the one or more authentication parameters through network 102 in a cloud-based environment. However, pressure-based authentication program 110 is not limited to the embodiments discussed herein and may receive the one or more authentication parameters through any method known in the art.

Pressure-based authentication program 110 stores the user registration data and the authorization parameters associated with the user (step 216). In one embodiment, the user registration data, the authorization parameters, and the authentication parameters associated with the user may be stored in a database, such as database 112. In another embodiment, the user registration data, the authorization parameters, and the authentication parameters associated with the user may be stored in a cloud-based environment on multiple databases through network 102. The user registration data, the authorization parameters, and the authentication parameters associated with the user may be stored in a cloud-based environment in other embodiments.

Figure 3:
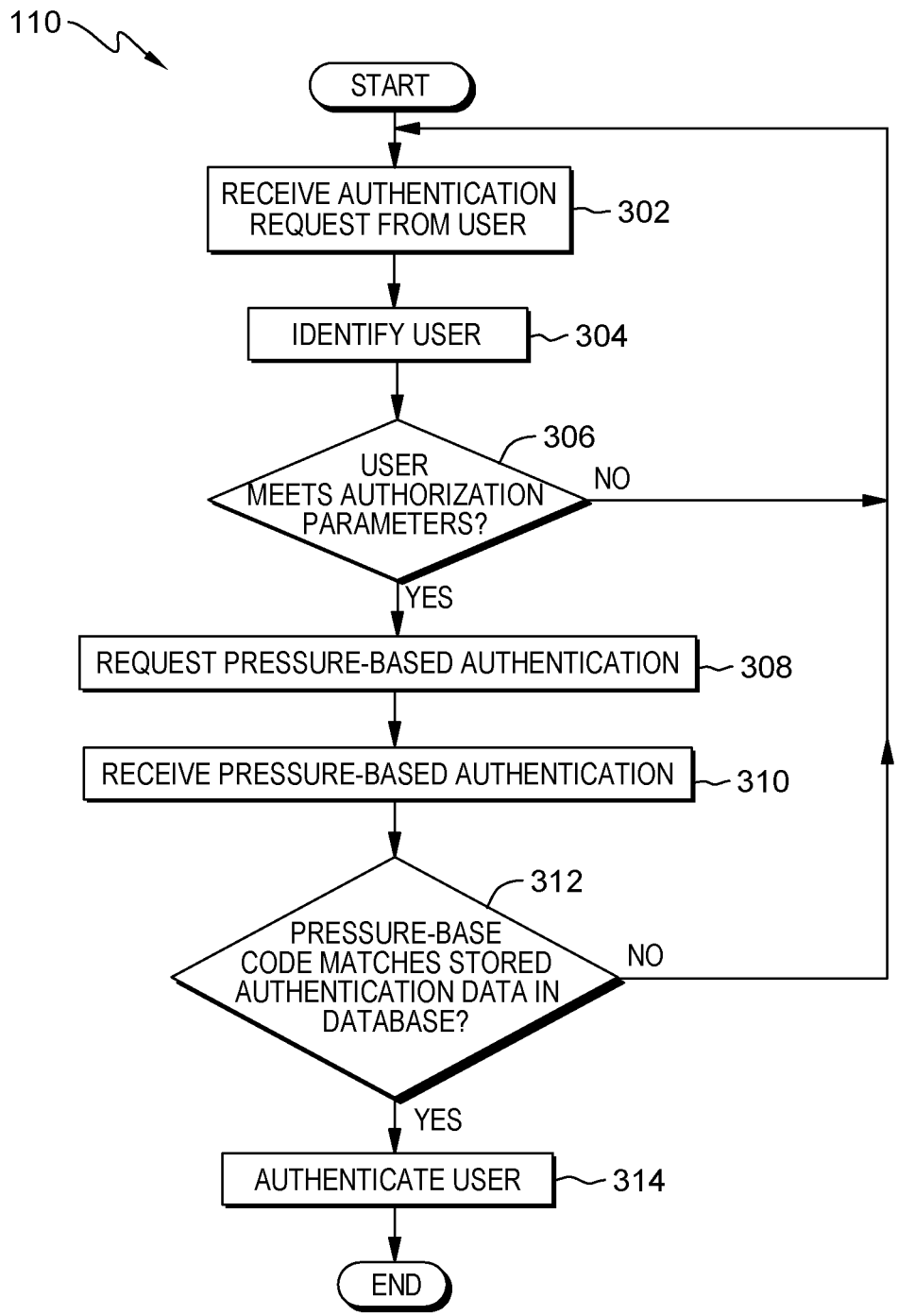
FIG. 3 is a flowchart depicting operational steps of a second function of a pressure-based authentication program, on a server computer within the distributed data processing environment of FIG. 1, for receiving pressure-based authentication and authorizing one or more users, in accordance with an embodiment of the present invention.

FIG. 3 is a flowchart depicting operational steps of a second function of pressure-based authentication program 110, on server computer 108 within distributed data processing environment 100 of FIG. 1, a program authenticating a user based on pressure-based authentications, in accordance with an embodiment of the present invention. The second function of pressure-based authentication program 110 starts when pressure-based authentication program 110 receives an authentication request from a user.

Pressure-based authentication program 110 receives one or more authentication requests from one or more users (step 302). In one embodiment, pressure-based authentication program 110 may receive one or more authentication requests from a user of a smartphone. For example, an authentication request may be a user accessing a mobile banking application and selecting the password input box which is sent as an authentication request to pressure-based authentication program 110. In another embodiment, pressure-based authentication program 110 may receive one or more authentication requests from a user of a desktop computer. For example, an authentication request may be a user accessing a computer program and selecting the password input box which is sent as an authentication request to pressure-based authentication program 110. In another example, an authentication request may be a user of a desktop computer accessing a financial services website and selecting the password input box on a web-user interface which is subsequently sent as an authentication request to pressure-based authentication program 110. However, pressure-based authentication program 110 is not limited to the embodiments discussed herein and may receive one or more authentication requests from one or more users in any way available in the art.

Pressure-based authentication program 110 identifies one or more users associated with the one or more authentication requests (step 304). In one embodiment, pressure-based authentication program 110 may identify one or more users associated with the one or more authentication requests based on unique identifiers tied to the identity of the user. For example, pressure-based authentication program 110 may identify a user associated with an authentication request to access a mobile banking application by identifying the internet protocol (IP) address and geolocation associated with the authentication request. In another example, pressure-based authentication program 110 may identify a user associated with an authentication request to access a financial services website by identifying an encryption key present on a separate file in the computer of a user and geolocation associated with the authentication request. In yet another example, pressure-based authentication program 110 may identify a user associated with an authentication request to access a confidential website based on the virtual private network (VPN) used by a user to access the confidential website. However, pressure-based authentication program 110 is not limited to the embodiments discussed herein and may identify one or more users associated with the one or more authentication requests in any way known in the art.

Pressure-based authentication program 110 determines whether the one or more users meet the one or more authorization parameters (decision block 306). In one embodiment, pressure-based authentication program 110 determines whether a user falls within a required period of time in the day and a required geolocation to access secured data. In another embodiment, pressure-based authentication program 110 determines whether a user accessed the protected information through a particular VPN associated with an approved channel for access. In yet another embodiment, pressure-based authentication program 110 determines whether the user has an encryption key present on the computing device 104 used to access the locked information. In an alternative embodiment, pressure-based authentication program 110 does not determine whether the one or more users meet the one or more authorization parameters. For example, pressure-based authentication program 110 may not require any form of authorization for generally accessible services, such as authorization to use a publicly available email service.

Responsive to determining that the one or more users do not meet the one or more authorization parameters ("No" branch, decision block 306), pressure-based authentication program 110 returns to receive one or more authentication request from one or more users (step 302). For example, pressure-based authentication program 110 may require an authentication request to come from particular geolocation to meet one or more authorization parameters which allows a user to request access to locked data. If the user attempts to make an authentication request, pressure-based authentication program 110 may deny the user the ability to input any pressure-based authentication into the if the user does not meet the required geolocation for the authentication request.

In one embodiment, pressure-based authentication program 110 may receive one or more authentication requests from a user of a smartphone. For example, an authentication request may be a user accessing a mobile banking application and selecting the password input box which is sent as an authentication request to pressure-based authentication program 110. In another embodiment, pressure-based authentication program 110 may receive one or more authentication requests from a user of a desktop computer. For example, an authentication request may be a user accessing a computer program and selecting the password input box which is sent as an authentication request to pressure-based authentication program 110. In another example, an authentication request may be a user of a desktop computer accessing a financial services website and selecting the password input box on a web-user interface which is subsequently sent as an authentication request to pressure-based authentication program 110. In an alternative embodiment, pressure-based authentication program 110 may not require a user to meet authorization parameters. In this case, pressure-based authentication program 110 automatically meets the one or more non-existent authorization parameters in decision block 306 and skip directly to step 308 and request one or more pressure-based authentications. However, pressure-based authentication program 110 is not limited to the embodiments discussed herein and may receive one or more authentication requests from one or more users in any way available in the art.

Responsive to determining that the one or more users meet the one or more authorization parameters ("Yes" branch, decision block 306), pressure-based authentication program 110 requests one or more pressure-based authentications (step 308). In one embodiment, pressure-based authentication program 110 may send a request to a user for the one or more pressure-based authentications through a notification, such as a notification on a smart phone via on user interface 106. For example, pressure-based authentication program 110 may send computing device 104 program instructions to allow a user to input a pressure-based authentication into a password input box in a mobile banking application by opening up a virtual keyboard to accept pressure-based inputs from the user. In another example, pressure-based authentication program 110 may send computing device 104 program instructions to allow a user to input a pressure-based authentication into a password input box in a web-user interface by instructing computing device 104 to receive user inputs in an authentication entry box on user interface 106 and changing the appearance of the authentication entry box to indicate that pressure-based authentication program 110 will accept pressure-based inputs from the user. In another example, pressure-based authentication program 110 may allow a user to input a pressure-based authentication directly into server computer 108, such as an automated teller machine (ATM) present at a branch of a financial institution on which pressure-based authentication program 110 resides. However, pressure-based authentication program 110 is not limited to the embodiments discussed herein and may request one or more pressure-based authentications using any method known in the art.

Pressure-based authentication program 110 receives one or more pressure-based authentications (step 310). In one embodiment, pressure-based authentication program 110 receives one or more pressure-based authentications directly through user input into a local program. For example, a user may input the pressure-based authentication using a touch pad on a laptop computer into a computer program executed from a hard drive on a laptop computer. In another embodiment, pressure-based authentication program 110 receives one or more pressure-based authentications through network 102 on server computer 108. For example, a user may input the pressure-based authentication using a touch pad on a laptop computer into a web-user interface that is sent to pressure-based authentication program 110 through the Internet to a server computer of a company. In yet another embodiment, pressure-based authentication program 110 receives one or more pressure-based authentications through network 102 in a cloud-based environment. However, pressure-based authentication program 110 is not limited to the embodiments discussed herein and may receive one or more pressure-based authentications using any method known in the art.

Pressure-based authentication program 110 determines whether the one or more pressure-based authentications match the stored authentication data (decision block 312). Pressure-based authentication program 110 may determine whether the one or more pressure-based authentications match the stored authentication data by comparing one or more pressure-based authentications with stored authentication data associated with a user and the authorization parameters associated with the user in a database. For example, pressure-based authentication program 110 may match a user authentication input of an alphanumeric code coupled with pressure-based color inputs for each character and verify that the alphanumeric code and color associated with each character are identical to the stored authentication data. In one embodiment, pressure-based authentication program 110 determines whether the pressure-based authentication matches authentication data stored in a physical database, such as database 112, over network 102. In another embodiment, pressure-based authentication program 110 determines whether the pressure-based authentication matches authentication data stored in a cloud environment over network 102. However, pressure-based authentication program 110 is not limited to the embodiments discussed herein and may determine whether the one or more pressure-based authentications match the stored authentication data using any method known in the art.

Responsive to determining that the one or more pressure-based authentications do not match the stored authentication data ("No" branch, decision block 312), pressure-based authentication program 110 returns to receive one or more authentication request from one or more users (step 302). In one embodiment, pressure-based authentication program 110 may receive one or more authentication requests from a user of a smartphone. For example, an authentication request may be a user accessing a mobile banking application and selecting the password input box which is sent as an authentication request to pressure-based authentication program 110. In another embodiment, pressure-based authentication program 110 may receive one or more authentication requests from a user of a desktop computer. For example, an authentication request may be a user accessing a computer program and selecting the password input box which is sent as an authentication request to pressure-based authentication program 110. In another example, an authentication request may be a user of a desktop computer accessing a financial services website and selecting the password input box on a web-user interface which is subsequently sent as an authentication request to pressure-based authentication program 110.

In an alternative embodiment, pressure-based authentication program 110 may lock the account associated with the user responsive to determining that the one or more pressure-based authentications do not match the stored authentication data. For example, an authentication request made by a user with the correct alphanumeric character but incorrect color inputs for each alphanumeric character may be locked out of the account either temporarily or permanently. In yet another embodiment, pressure-based authentication program 110 may partially lock the account associated with the user responsive to determining that the one or more pressure-based authentications do not match the stored authentication data. For example, an authentication request made by a user with the correct alphanumeric character but incorrect color inputs for each alphanumeric character may be granted access to less sensitive data associated with the account and locked out of data requiring a higher security clearance either temporarily or permanently. However, pressure-based authentication program 110 is not limited to the embodiments discussed herein and may receive one or more authentication requests from one or more users using any method known in the art.

Responsive to determining that the one or more pressure-based authentications match the stored authentication data ("Yes" branch, decision block 312), pressure-based authentication program 110 authenticates the one or more users (step 314). In one embodiment, pressure-based authentication program 110 may authenticate a user to allow the user to access protected data on a local hard drive. In another embodiment, pressure-based authentication program 110 may authenticate a user to allow the user to access protected data on server computer 108. In yet another embodiment, pressure-based authentication program 110 may authenticate a user to allow the user to access protected data on a multiple databases connected through a cloud-based environment. However, pressure-based authentication program 110 is not limited to the embodiments discussed herein and may authenticate the one or more users using any method known in the art.

Figure 4:
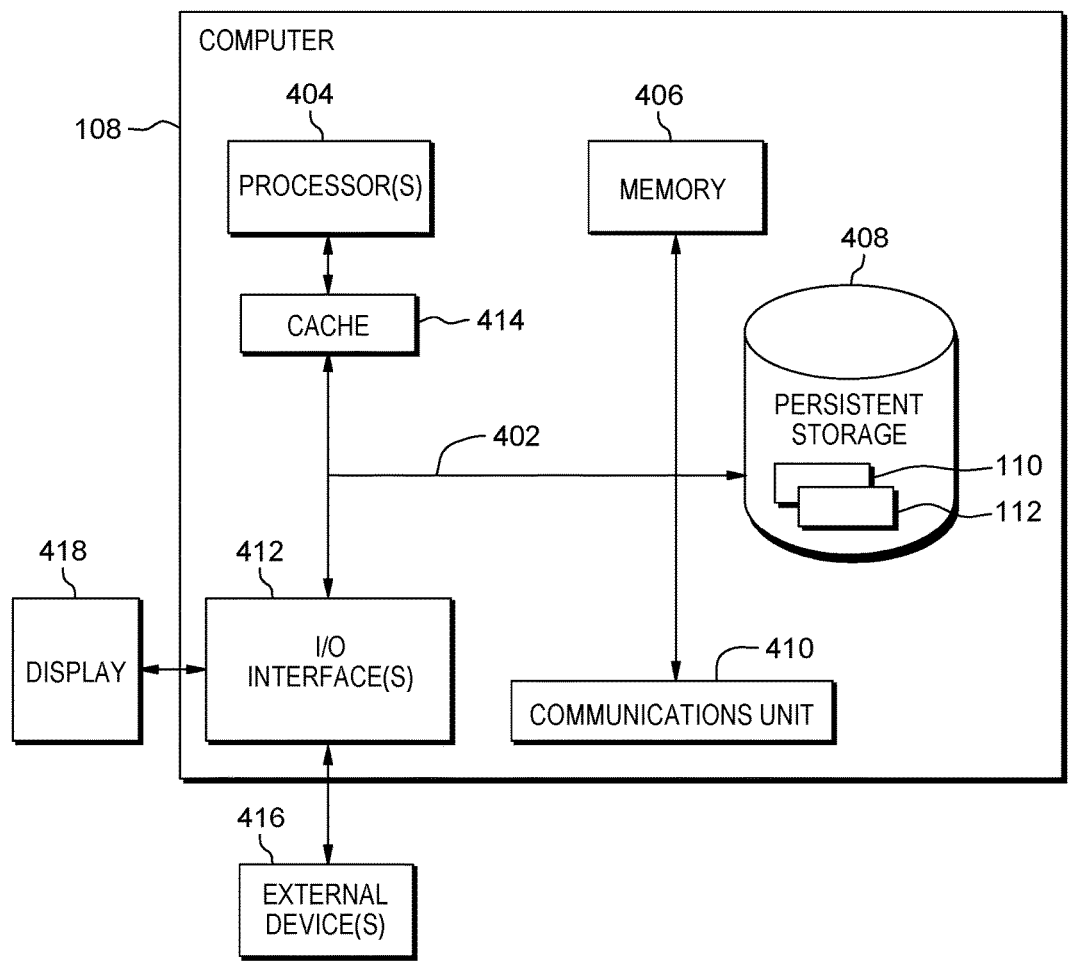
FIG. 4 depicts a block diagram of components of the server computer executing the pressure-based authentication program within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., pressure-based authentication program 110 and database 112, are stored in persistent storage 408 for execution and/or access by one or more of the respective processor(s) 404 of server computer 108 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 508.

Communications unit 410, in these examples, provides for communications with other data processing systems or devices, including resources of computing device 104. In these examples, communications unit 410 includes one or more network interface cards. Communications unit 410 may provide communications through the use of either or both physical and wireless communications links. Pressure-based authentication program 110, database 112, and other programs and data used for implementation of the present invention, may be downloaded to persistent storage 408 of server computer 108 through communications unit 410.

I/O interface(s) 412 allows for input and output of data with other devices that may be connected to server computer 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., pressure-based authentication program 110 and database 112 on server computer 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 518 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
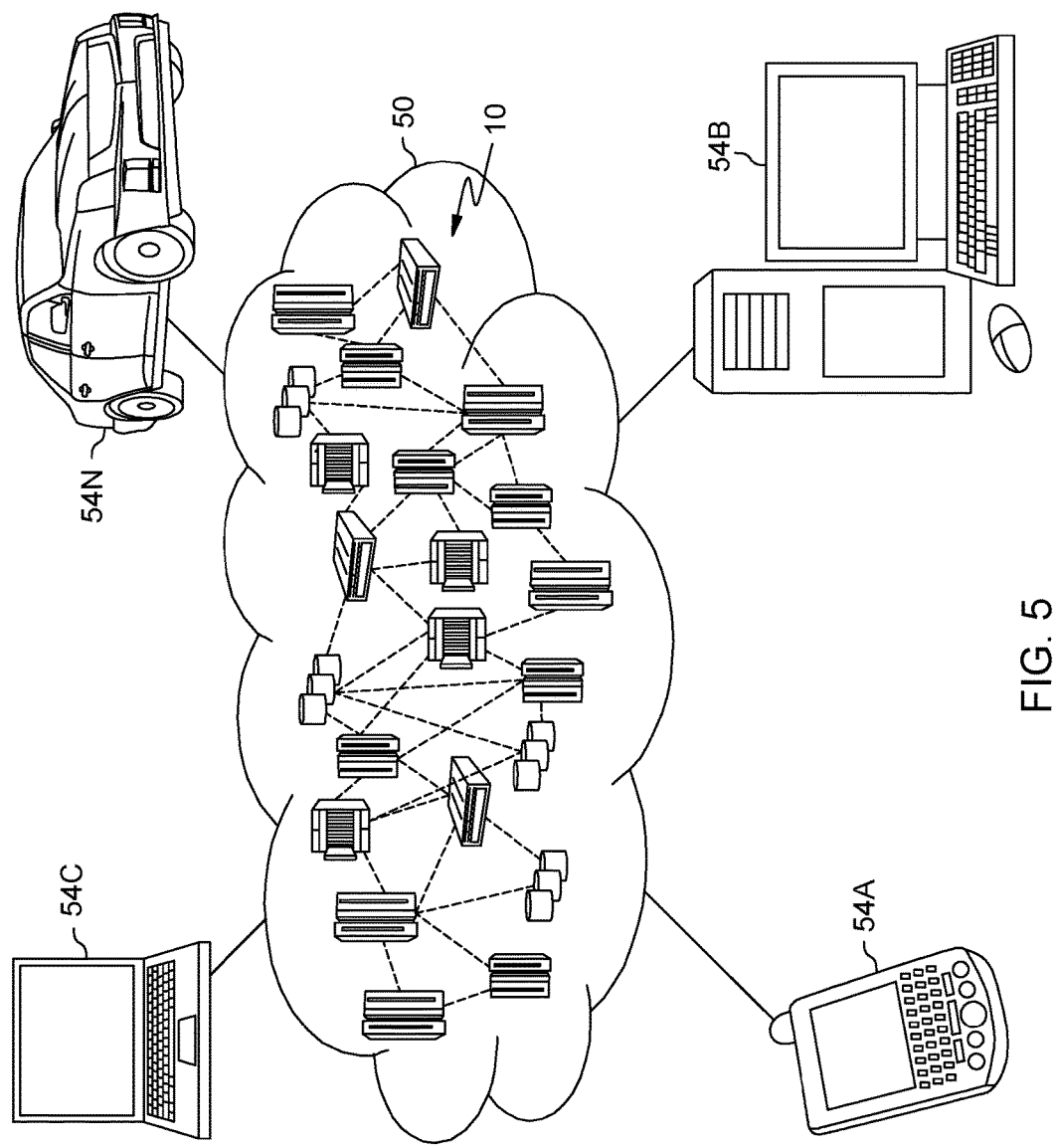
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. Server computer 108 may be one instance of node 10. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 6:
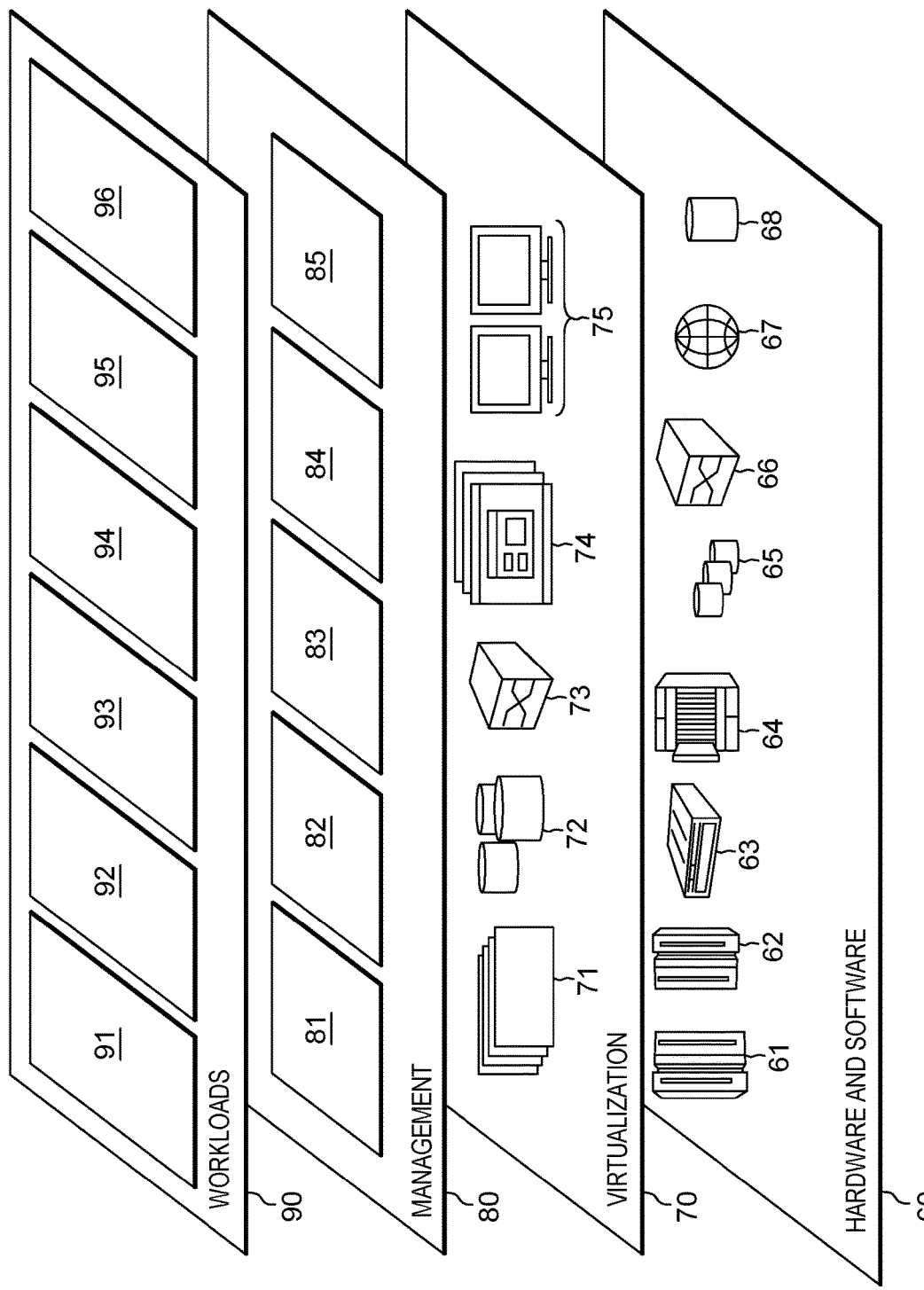
FIG. 6 depicts abstraction model layers according to an embodiment of the present invention.

Referring now to FIG. 6, a set of functional abstraction layers provided by cloud computing environment 50 (FIG. 1) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; pressure-based authentication processing 96; and pressure-based authentication program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method (CIM) comprising:
  receiving user registration data, wherein the user registration data includes a set of authentication parameters, wherein a given authentication parameter is associated with at least one physical pressure-based input value(s) corresponding to a force value applied to a pressure-sensitive input module, and the set of authentication parameters includes the following parameters: (i) an access code, (ii) a time, (iii) a name of the user, and (iv) a geographical location, where a given physical pressure-based input of the at least one physical pressure-based input value(s) associated with the access code is associated with a single character of an access code string and further associated with a sound corresponding to the force value applied to a pressure-sensitive input module, where single characters of the access code string are either an alphanumeric character or a symbol character;
  receiving, by the one or more computer processors, an access request requiring an authentication from the user, wherein the access request includes the one or more physical pressure-based input value(s) by the user associated with the set of authentication parameters, wherein the pressure-based authentication includes both a pressure input value and the sound based on the pressure input value for a given character of the access code string;
  determining, by the one or more computer processors, whether the set of authentication parameters of the access request match the user registration data; and
  responsive to determining that the authentication data matches the registration data, authenticating, by the one or more computer processors, access for the user.

2. The method of claim 1, further comprising:
identifying, by the one or more computer processors, one or more credentials associated with the user;
determining, by the one or more computer processors, whether the identified user meets one or more authorization parameters; and
responsive to determining that the identified user meets the one or more authorization parameters, allowing, by the one or more computer processors, the identified user to input the authentication.

3. The method of claim 1, wherein the pressure input value is displayed with an alphanumeric character and a color is displayed with an alphanumeric character.

4. The method of claim 1, wherein receiving the access request requiring the authentication from the user further comprises:
retrieving, by the one or more computer processors, one or more pressure value ratios for the device associated with the access request; and
applying, by the one or more computer processors, the one or more pressure value ratios for the device associated with the access request to the authentication from the user.

5. The method of claim 1, wherein user access is further restricted by an internet protocol (IP) address associated with the user registration data.

6. The method of claim 1, wherein the pressure-based authentication is based on one or more non-pressure-based inputs.

7. The method of claim 1, wherein receiving the access request requiring the authentication from the user, wherein the access request includes the one or more physical pressure-based inputs values by the user associated with the set of authentication parameters further comprises:
detecting, by the one or more computer processors, an input pressure using one or more pressure sensors associated with an input medium;
determining, by the one or more computer processors, an input pressure value based on an amount of pressure exerted on the input medium; and
associating, by the one or more computer processors, the input pressure value with a given physical pressure-based input corresponding to the authentication of the one or more physical-pressure based inputs corresponding to the authentication.

8. The method of claim 7, wherein the determined input pressure value is selected from a group consisting of: an alphanumeric character, a visual feedback, a mechanical feedback, a color, and a sound-based feedback.

9. The method of claim 7, wherein determining an input pressure value based on an amount of pressure exerted on the input medium further comprises:
calculating, by the one or more computer processors, a minimum detectable pressure and a maximum detectable pressure associated with the input medium associated with the device;
determining, by the one or more computer processors, a pressure sensitivity scale based on the minimum detectable pressure and the maximum detectable pressure associated with the input medium;
comparing, by the one or more computer processors, the pressure sensitivity scale to a standardized pressure sensitivity scale; and
calculating, by the one or more computer processors, a pressure value ratio to match the standardized pressure sensitivity scale on the input medium.

10. The method of claim 7, wherein determining an input pressure value based on the amount of pressure exerted on the input medium further comprises:
receiving, by the one or more computer processors, an annotation from a particular device;
comparing, by the one or more computer processors, the input pressure value associated with the annotation for the particular device using a device-specific key; and
determining, by the one or more computer processors, the input pressure value associated with the annotation from the particular device based on the device-specific key.

11. A computer program product comprising:
one or more computer readable storage device; and
program instructions stored on the one or more computer readable storage devices, with the stored program instructions including instructions for causing one or more computer processors to perform operations including the following:
receiving user registration data, wherein the user registration data includes a set of authentication parameters, wherein a given authentication parameter is associated with at least one physical pressure-based input value(s) corresponding to a force value applied to a pressure-sensitive input module, and the set of authentication parameters includes the following parameters: (i) an access code, (ii) a time, (iii) a name of the user, and (iv) a geographical location, where a given physical pressure-based input of the at least one physical pressure-based input value(s) associated with the access code is associated with a single character of an access code string and further associated with a sound corresponding to the force value applied to a pressure-sensitive input module, where single characters of the access code string are either an alphanumeric character or a symbol character,
receiving an access request requiring an authentication from the user, wherein the access request includes the one or more physical pressure-based input value(s) by the user associated with the set of authentication parameters, wherein the pressure-based authentication includes both a pressure input value and the sound based on the pressure input value for a given character of the access code string,
determining whether the set of authentication parameters of the access request match the user registration data, and
responsive to determining that the authentication data matches the registration data, authenticating access for the user.

12. The computer program product of claim 11 further comprising:
identifying one or more credentials associated with the user;
determining whether the identified user meets one or more authorization parameters; and
responsive to determining that the identified user meets the one or more authorization parameters, allowing the identified user to input the authentication.

13. The computer program product of claim 11, wherein receiving the access request requiring the authentication from the user further comprises:
retrieving one or more pressure value ratios for the device associated with the access request; and
applying the one or more pressure value ratios for the device associated with the access request to the authentication from the user.

14. The computer program product of claim 11, wherein user access is restricted further restricted by an internet protocol (IP) address associated with the user registration data.

15. The computer program product of claim 11, wherein receiving the access request requiring the authentication from the user, wherein the access request includes the one or more physical pressure-based inputs by the user associated with the set of authentication parameters further comprises:
 detecting an input pressure using one or more pressure sensors associated with an input medium;
 determining an input pressure value based on an amount of pressure exerted on the input medium; and
 associating the input pressure value with a given physical pressure-based input corresponding to the authentication of the one or more physical-pressure based inputs corresponding to the authentication.

16. The computer program product of claim 15, wherein the determined input pressure value is selected from a group consisting of: an alphanumeric character, a visual feedback, a mechanical feedback, a color, and a sound-based feedback.

17. The computer program product of claim 15, wherein determining an input pressure value based on an amount of pressure exerted on the input medium further comprises:
 calculating a minimum detectable pressure and a maximum detectable pressure associated with the input medium associated with the device;
 determining a pressure sensitivity scale based on the minimum detectable pressure and the maximum detectable pressure associated with the input medium;
 comparing the pressure sensitivity scale to a standardized pressure sensitivity scale; and
 calculating a pressure value ratio to match the standardized pressure sensitivity scale on the input medium.

18. The computer program product of claim 15, wherein determining an input pressure value based on the amount of pressure exerted on the input medium further comprises:
 receiving an annotation from a particular device;
 comparing the input pressure value associated with the annotation for the particular device using a device-specific key; and
 determining the input pressure value associated with the annotation from the particular device based on the device-specific key.

19. A computer system comprising:
 one or more computer processors;
 one or more computer readable storage devices;
 program instructions stored on the one or more computer readable storage devices for execution by at least one of the one or more computer processors, with the stored program instructions including instructions for causing one or more computer processors to perform operations including the following:
 receiving user registration data, wherein the user registration data, includes a set of authentication parameters, wherein a given authentication parameter is associated with at least one physical pressure-based input value(s) corresponding to a force value applied to a pressure-sensitive input module, and the set of authentication parameters includes the following parameters: (i) an access code, (ii) a time, (iii) a name of the user, and (iv) a geographical location, where a given physical pressure-based input of the at least one physical pressure-based input value(s) associated with the access code is associated with a single character of an access code string and further associated with a sound corresponding to the force value applied to a pressure-sensitive input module, where single characters of the access code string are either an alphanumeric character or a symbol character;
 receiving an access request requiring an authentication from the user, wherein the access request includes the one or more physical pressure-based input values by the user associated with the set of authentication parameters, wherein the pressure-based authentication includes both a pressure input value and the sound based on the pressure input value for a given character of the access code string;
 determining whether the set of authentication parameters of the access request match the user registration data; and
 responsive to determining that the authentication data matches the registration data, authenticating access for the user.

20. The computer system of claim 19, wherein receiving the access request requiring the authentication from the user, wherein the access request includes the one or more physical pressure-based inputs by the user associated with the set of authentication parameters further comprises:
 detecting an input pressure using one or more pressure sensors associated with an input medium;
 determining an input pressure value based on an amount of pressure exerted on the input medium; and
 associating the input pressure value with a given physical pressure-based input corresponding to the authentication of the one or more physical-pressure based inputs corresponding to the authentication.

* * * * *